(12) United States Patent
Mitamura

(10) Patent No.: US 7,619,781 B2
(45) Date of Patent: Nov. 17, 2009

(54) IMAGE PROCESSING AND MEDIUM MANAGEMENT WITH MEDIUM ID CODE IMAGE SUPERIMPOSED ON DOCUMENT IMAGE

(75) Inventor: Yoshihiko Mitamura, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 529 days.

(21) Appl. No.: 11/270,634

(22) Filed: Nov. 10, 2005

(65) Prior Publication Data

US 2006/0256369 A1     Nov. 16, 2006

(30) Foreign Application Priority Data

May 12, 2005   (JP)  ............... P2005-139421

(51) Int. Cl.
*H04N 1/44* (2006.01)
*G06F 7/04* (2006.01)
*G06F 17/16* (2006.01)

(52) U.S. Cl. ............ 358/3.28; 358/1.14; 358/403; 726/32; 235/375; 382/306

(58) Field of Classification Search ............ 358/3.28, 358/1.14, 1.15, 1.18, 403; 382/306; 726/32; 709/206; 235/375, 487, 494
See application file for complete search history.

(56) References Cited

U.S. PATENT DOCUMENTS

| | | | |
|---|---|---|---|
| 6,631,495 B2 * | 10/2003 | Kato et al. ............... 715/255 |
| 6,970,259 B1 * | 11/2005 | Lunt et al. ............... 358/1.14 |
| 2001/0029513 A1 | 10/2001 | Kuwano et al. ........... 707/522 |
| 2004/0049571 A1 * | 3/2004 | Johnson et al. .......... 709/224 |
| 2005/0088687 A1 * | 4/2005 | Atobe ..................... 358/1.15 |
| 2005/0276520 A1 * | 12/2005 | Leslie et al. ............. 382/306 |
| 2006/0221383 A1 * | 10/2006 | Katsurabayashi ........ 358/1.15 |
| 2006/0277483 A1 * | 12/2006 | Yamamoto ............... 715/764 |
| 2006/0285168 A1 * | 12/2006 | Horino et al. ........... 358/3.28 |
| 2007/0012769 A1 * | 1/2007 | Tanaka .................... 235/432 |
| 2008/0250479 A1 * | 10/2008 | Matoba ................... 726/5 |

FOREIGN PATENT DOCUMENTS

| | | |
|---|---|---|
| CN | 1194531 A | 9/1998 |
| JP | 7-319773 | 12/1995 |

* cited by examiner

*Primary Examiner*—Scott A Rogers
(74) *Attorney, Agent, or Firm*—Morgan, Lewis & Bockius LLP

(57) ABSTRACT

An image processing apparatus includes a document image generating section, a medium ID generating section, a correspondence information storing section and an image output section. A document image generating section generates a document image based on a managed data in the apparatus. A medium ID generating section generates a medium ID for identifying a medium on which the document image is printed. A correspondence information storing section stores correspondence information by which the managed data and the medium ID are correlated with each other. An image output section outputs an image in which a code image indicating the medium ID is superimposed on the document image.

14 Claims, 11 Drawing Sheets

FIG. 5

| MEDIUM ID | USER ID | OUTPUT DATE AND TIME | INTERNAL DATA |
|---|---|---|---|
| ABC001000001 | A | 05/04/26 10:10 | F (XX, YY, ZZ) |
| ABC001000002 | B | 05/04/27 12:20 | E (XX, ZZ) |
| ABC001000003 | C | 05/04/28 14:30 | FE (XX, YY) |
| ⋮ | ⋮ | ⋮ | ⋮ |

FIG. 6A
FIG. 6B
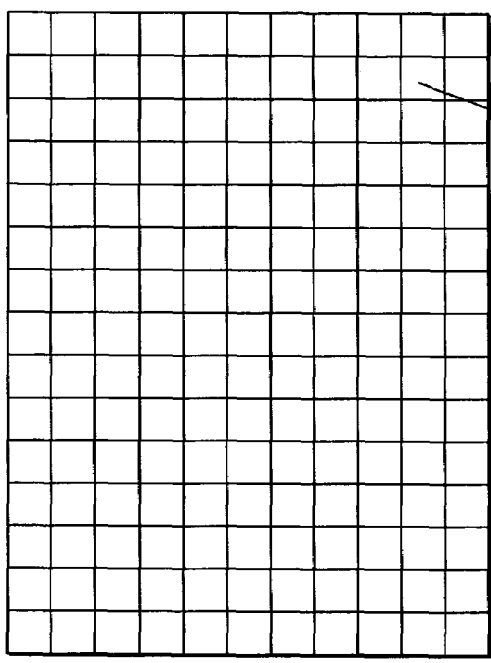
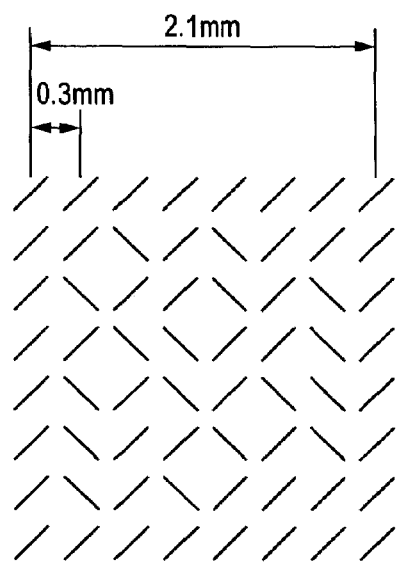

IMAGE PROCESSING AND MEDIUM MANAGEMENT WITH MEDIUM ID CODE IMAGE SUPERIMPOSED ON DOCUMENT IMAGE

BACKGROUND OF THE INVENTION

1. Field of the Invention

The present invention relates to an image processing apparatus or the like for generating an image to be printed on a medium based on managed data in the apparatus.

2. Description of the Related Art

In recent years, what is called multifunction machines that combine a copier function, a fax function, a printer function, a scanner function, etc. have been put into the market as image forming apparatus. When the fax function is used among those functions, in many cases the destination of a fax transmission is one of a limited number of business connections. Therefore, usually, in image forming apparatus, fax numbers of business connections to which a fax transmission is made frequently are registered in advance so that the destination of each fax transmission can be designated by an easy manipulation.

Some machine types have a function (scan mail function) of transmitting document data read by the scanner function in such a manner that the data are attached to an e-mail. Also in this case, business connections to which e-mails are sent frequently are limited in number and hence it is a common procedure to register e-mail addresses of those business connections in advance.

As described above, in recent image forming apparatus, it is a common procedure to store fax numbers and/or e-mail addresses inside. However, fax numbers and e-mail addresses are a kind of personal information and hence should be managed carefully so as not to leak outside. In this connection, techniques for preventing leakage of important data managed inside an image forming apparatus have been proposed.

In particular, the social concern about the personal information has risen in recent years as exemplified by the enforcement of the Personal Information Protection Law. Therefore, it is now urgently required to manage, more strictly than before, personal information that is managed inside image forming apparatus and to take measures to prevent such information from leaking outside.

SUMMARY OF THE INVENTION

As described above, the techniques for preventing managed data inside an image forming apparatus from leaking outside are available conventionally. For example, in the related art described above, access to data is permitted if a permission flag is "on." However, there is a problem that where access is restricted by this method data that are taken out with access permission cannot be managed sufficiently. That is, if data that were taken out leak outside, a situation may occur that even information of who took out the data is not available.

The present invention has been made in view of the above circumstances and provides an image forming apparatus.

Further, the embodiment of the present invention addresses an image forming apparatus to trace a person who was involved in the leakage, the content of the leakage data, etc. even if data managed by an image forming apparatus have leaked outside.

According to an aspect of the present invention, there is provided an image processing apparatus including a document image generating section that generates a document image based on a managed data in the apparatus, a medium ID generating section that generates a medium ID for identifying a medium on which the document image is printed, a correspondence information storing section that stores correspondence information by which the managed data and the medium ID are correlated with each other, and an image output section that outputs an image in which a code image indicating the medium ID is superimposed on the document image.

According to another aspect of the embodiment of the present invention, there is provided an image processing apparatus including a document image generating section that generates a document image based on a managed data in the apparatus according to an instruction, a code image generating section that generates a code image for identifying the instruction, and an image output section that outputs an image in which the code image is superimposed on the document image.

According to a further aspect of the present invention, there is provided an image reading apparatus including an image input section that inputs a code image from a medium on which a document image based on managed data in an apparatus is printed according to an instruction, a medium ID acquiring section that acquires a medium ID for identifying the medium by analyzing the code image, and an information output section that outputs information used for retrieving at least one of data related to the instruction and the managed data based on the medium ID, wherein the code image is superimposed on the document image.

According to a further aspect of the present invention, there is provided an image forming apparatus including: a document image generating section that generates a document image based on a managed data in the apparatus, a medium ID generating section that generates a medium ID for identifying a medium on which the document image is printed, and a print processing section that prints a code image indicating the medium ID and the document image on the medium, wherein the code image and the document image are superimposed on each other.

According to a further aspect of the present invention there is provided a print medium including: a document image based on a managed data in an apparatus, and a code image indicating a medium ID for identifying the printed medium superimposed on the document image, wherein the document image and the code image are printed on the medium, and wherein the managed data and the medium ID are correlated with each other.

According to a further aspect of the present invention, there is provided a medium managing method including generating a document image based on a managed data in an apparatus, according to an instruction, generating a medium ID for identifying a medium on which the document image is printed; storing correspondence information in a storage device, the correspondence information correlating at least one of data relating to the instruction and the managed data with the medium ID, printing a code image indicating the medium ID and the document image on the medium, acquiring the medium ID from a code image printed on a prescribed medium, and acquiring at least one of the data relating to the instruction and the managed data from the correspondence information stored in the storage device based on the medium ID, wherein the code image and the document image are superimposed on each other.

According to a still further aspect of the present invention, there is provided a storage medium readably by a computer. The storage medium stores a program of instructions executable by the computer to perform a function: generating a document image based on a managed data in an apparatus, according to an instruction, generating a medium ID for identifying a medium on which the document image is printed, storing correspondence information in a storage device, the correspondence information correlating at least one of data relating to the instruction or the managed data with the medium ID, and outputting an image in which a code image indicating the medium ID is superimposed on the document image.

BRIEF DESCRIPTION OF THE DRAWING

Embodiments of the present invention will be described in detail based on the following figures, wherein:

FIG. 5 shows an example of storage contents of a correspondence information storage section of the image forming apparatus according to the embodiment of the invention;

FIGS. 6A and 6B illustrate a two-dimensional code that is generated by a code image generating section of the image forming apparatus according to the embodiment of the invention;

DETAILED DESCRIPTION OF THE INVENTION

Embodiments according to the present invention will be hereinafter described in detail with reference to the accompanying drawings.

In this specification, the term "document image based on a managed data in the apparatus" includes not only a document image obtained by editing data that are managed in the apparatus but also a document image obtained by editing data that are obtained from outside the apparatus by referring to address information such as URLs (uniform resource locators) that are managed in the apparatus.

Figure 1:
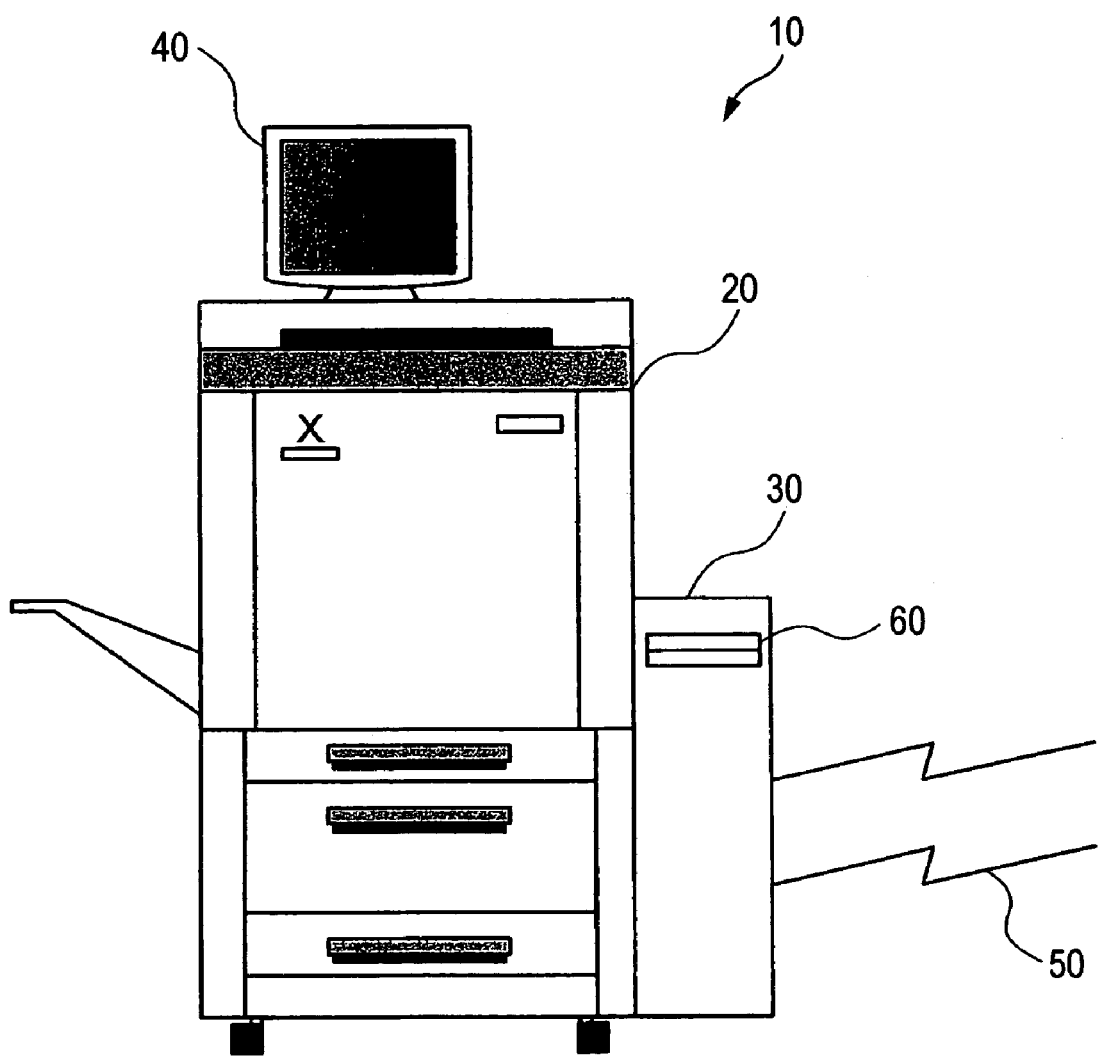
FIG. 1 shows an appearance of an image forming apparatus according to an embodiment of the invention.

FIG. 1 shows an appearance of an image forming apparatus 10 according to the embodiment.

As shown in FIG. 1, the image forming apparatus 10 according to the embodiment includes an apparatus, main body 20 which prints input image data on a medium such as a sheet, a processing apparatus 30 that processes specified image data, and an input/output device 40 which is used as an operating panel for, for example, selecting from various functions of the image forming apparatus 10. The image forming apparatus 10 also includes a communication device 50 which functions as a communicating means to be connected to an external apparatus and slots 60 which enable insertion and removal of portable recording media such as optical discs (various kinds of DVDs (digital versatile discs), various kinds of CDs, etc.) and various kinds of memory cards.

The apparatus main body 20 functions as a printer that produces a full-color print image by forming a toner image based on input image data. Including a scanner, the apparatus main body 20 can also function as a digital copier which outputs image data that are read by the scanner. Further, the apparatus main body 20 can function as a facsimile machine which transmits, via a telephone line, image data read by the scanner and outputs image data that are received from another apparatus via a telephone line.

The processing apparatus 30 is a computer apparatus such as a personal computer (PC), a server, or the like and includes a drive device that reads data from various kinds of recording media.

The input/output device 40 includes a display such as a liquid crystal display (LCD). A touch panel, for example, may be formed on the surface of the display so as to provide an input function of a user interface. Where the touch panel function is not provided, an input panel (not shown), a pointing device, or the like may be provided separately on, for example, the top surface of the apparatus main body 20 so that a user can make a manipulation input on the input/output device 40.

Having cables, for example, the communication device 50 can acquire information on apparatus connected to the cables and image data. Further, the communication device 50 enables bidirectional communication that allows an instruction from the processing apparatus 30 to be transmitted to the apparatus connected to the cables. Usable interface standards include USB (universal serial bus), IEEE1394 (Institute of Electrical and Electronic Engineers 1394), and SCSI (small computer system interface). Instead of having cables, the communication device 50 may have merely interface connectors that can be used by those data transmission methods. To facilitate recognition by a user, it is preferable that the cables of the communication device 50 be colored differently for the respective communication functions or tags on which such names as "USB" and "IEEE1394" are written be attached to the terminal portions of the cable to which the apparatus are connected.

Next, a functional configuration of the processing apparatus 30 will be described.

Figure 2:
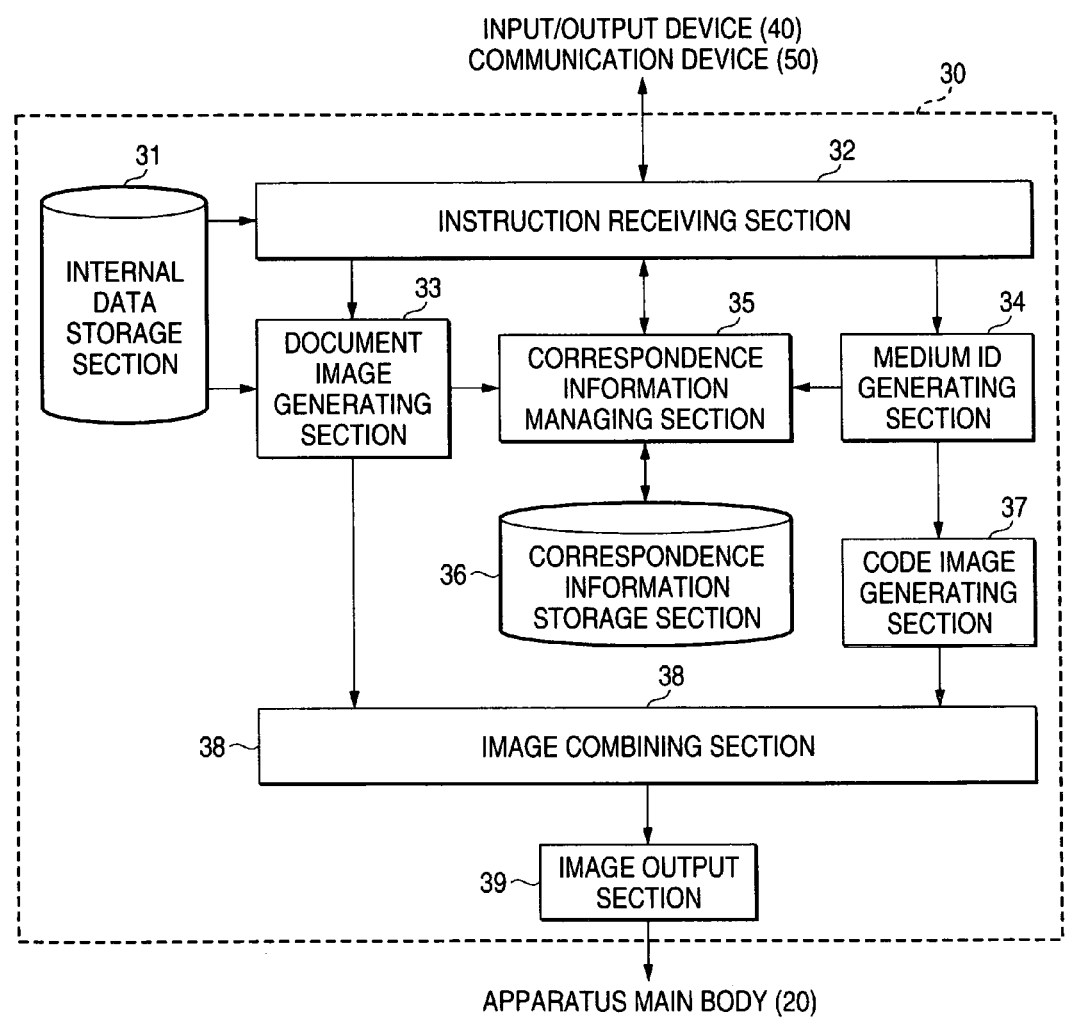
FIG. 2 is a block diagram showing a functional configuration of a processing apparatus of the image forming apparatus according to the embodiment of the invention.

FIG. 2 is a block diagram showing the functional configuration of the processing apparatus 30.

The processing apparatus 30 includes an internal data storage section 31, an instruction receiving section 32, a document image generating section 33, a medium ID generating section 34, a correspondence information managing section 35, a correspondence information storage section 36, a code image generating section 37, an image combining section 38, and an image output section 39.

The internal data storage section 31 stores data (hereinafter referred to as "internal data") managed by the image forming apparatus 10. Examples of the internal data are a fax number that is specified as a destination in using the fax function and an e-mail address that is specified as a destination in using the scanmail function. In addition to such personal information, every data, such as setting information of the image forming apparatus 10, that should be prevented from being leaking outside can be the internal data. The internal data storage section 31 is an external storage device such as a magnetic disk.

The instruction receiving section 32 causes the input/output device 40 to display a picture that urges input of information, receives an instruction from the input/output device 40, and controls an image generating operation according to the received instruction.

The document image generating section 33 reads internal data specified by the instruction receiving section 32 from the internal data storage section 31 and generates a document image based on the read-out internal data.

The medium ID generating section 34 generates, in response to an instruction from the instruction receiving section 32, a medium ID to be used for uniquely identifying a medium on which the document image is to be printed. For example, each medium ID is generated by combining an apparatus ID to be used for uniquely identifying the image forming apparatus 10 and a serial number that is given to each medium on which printing will be performed by the image forming apparatus 10.

The correspondence information managing section 35 manages correspondence information that correlates a user ID supplied from the instruction receiving section 32, the document image generated by the document image generating section 33, the medium ID generated by the medium ID generating section 34, and other information. The correspondence information storage section 36 is a memory for storing the correspondence information and is an external storage device such as a magnetic disk.

The code image generating section 37 generates a code image indicating the medium ID generated by the medium ID generating section 34.

The image combining section 38 generates a composite image obtained by combining the image generated by the document image generating section 33 and the code image generated by the code image generating section 37.

The image output section 39 outputs the composite image to the device main body 20.

The above functional components are implemented through cooperation between software and hardware resources. More specifically, the CPU of the processing apparatus 30 reads programs for realizing the functions of the instruction receiving section 32, the document image generating section 33, the medium ID generating section 34, the correspondence information managing section 35, the code image generating section 37, the image combining section 38, and the image output section 39 from an external storage device into the main storage device, and performs processing.

Next, a process executed by the processing apparatus 30 will be described in detail.

Figure 3:
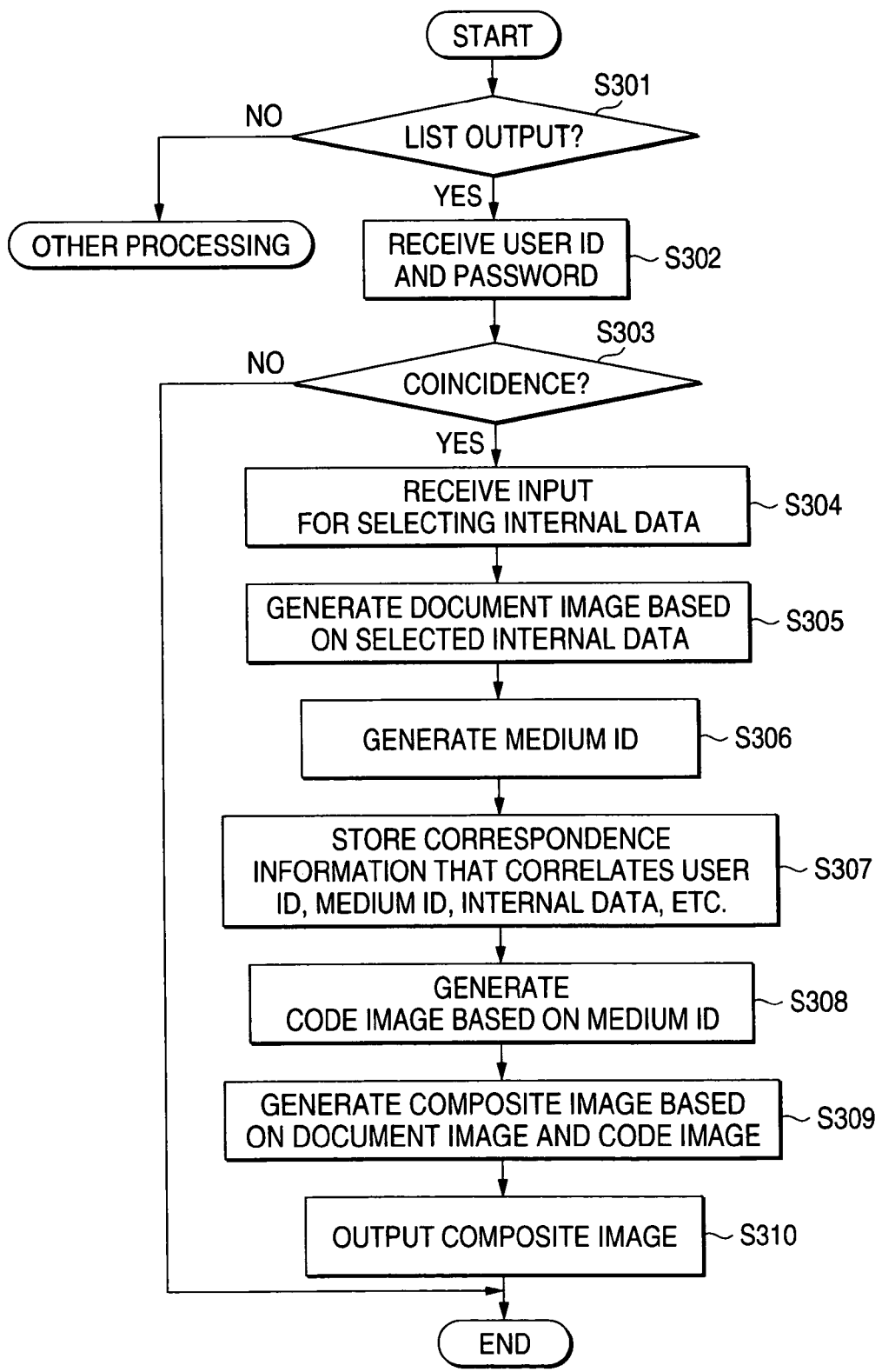
FIG. 3 is a flowchart of a process executed by the processing apparatus of the image forming apparatus according to the embodiment of the invention.

FIG. 3 is a flowchart of the process executed by the processing apparatus 30.

Figure 4A:
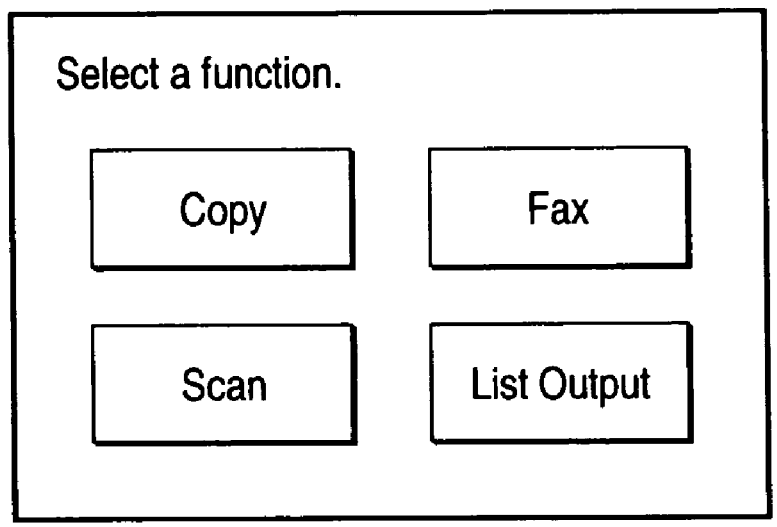
FIGS. 4A and 4B show exemplary pictures displayed on an input/output device of the image forming apparatus according to the embodiment of the invention.

In the initial state, a menu picture as shown in FIG. 4A is displayed on the input/output device 40. An operation according to this embodiment starts when "list output" is selected from the menu of FIG. 4A. That is, the instruction receiving section 32 of the processing apparatus 30 judges whether "list output" has been selected (step 301). If one of the items other than "list output," that is, "copy," "fax," or "scan", has been selected, the selected function is performed.

Figure 4B:
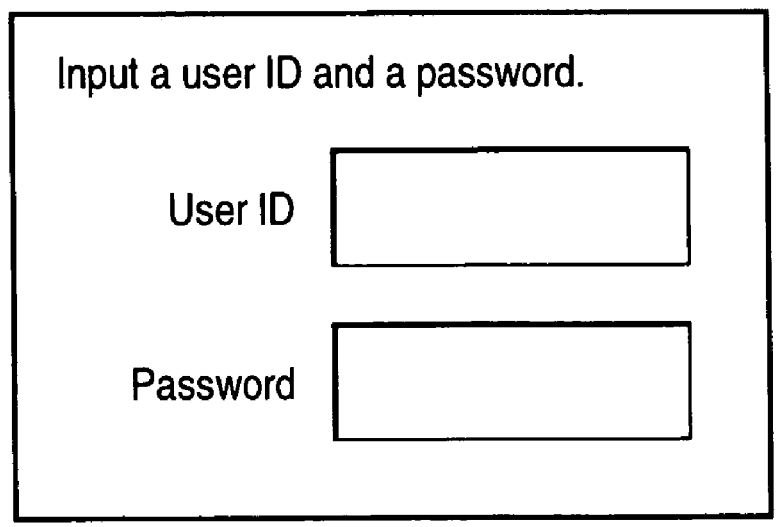

On the other hand, if "list output" has been selected, the instruction receiving section 32 causes the input/output device 40 to display a picture for input of a user ID and a password (see FIG. 4B). If a user inputs a user ID and a password in response, the instruction receiving section 32 receives those pieces of information (step 302). The instruction receiving section 32 judges whether the combination of the input user ID and password coincides with a registered combination of a user ID and a password (step S303). If no coincidence is found, the instruction receiving section 32 causes display of such a message as "the user ID or password is not correct" and the process is finished. On the other hand, if coincidence is found, the process moves to a process headed by step 304.

Although this process employs the user authentication method that a user ID and a password are input through a picture, the invention is not limited to such a case. For example, user authentication may be performed by using an IC card such as an employee card that was given to each user.

After completion of the user authentication, the instruction receiving section 32 receives an input for selecting internal data (step 304). Internal data may be destination information such as fax numbers and/or e-mail addresses of various business connections. Therefore, for example, the user specifies destination information of which companies should be list-output and what kind of information of the destination information should be list-output.

When internal data have been selected in this manner, information indicating the selected content is supplied to the document image generating section 33. Based on this information, the document image generating section 33 reads the selected internal data from the internal data storage section 31. The document image generating section 33 generates a document image that is edited in a format for printing the read-out internal data (step 305).

The instruction receiving section 32 instructs the medium ID generating section 34 to generate a medium ID. In response, the medium ID generating section 34 generates a medium ID for identification of a medium on which the document image generated at step 305 is to be printed (step 306). For example, the medium ID generating section 34 generates a medium ID by combining an apparatus ID that is stored in a memory (not shown) and a serial number that is stored in a memory (not shown) and incremented every time a medium on which printing will be performed is added.

When the document image and the medium ID have been generated in the above manner, the correspondence information managing section 35 stores, in the correspondence information storage section 36, correspondence information to be used for tracing the user who is involved in printing on the medium and the information content to be printed on the medium (step 307). The correspondence information is information that correlates the internal data for which the list output was ordered, the user ID of the user who ordered the list output, a date and time of the list output, and the medium ID of the medium to which a list will be output. The correspondence information managing section 35 can register such correspondence information by receiving the internal data from the document image generating section 33, for example, receiving the user ID from the instruction receiving section 32, for example, receiving a date and time from a timer (not shown), and receiving the medium ID from the medium ID generating section 34.

FIG. 5 shows an example of storage contents of the correspondence information storage section 36.

As shown in FIG. 5, pieces of correspondence information that correlates medium IDs, user IDs, output dates and times, and internal data, respectively, are stored in the correspondence information storage section 36. In each medium ID, the first-half six figures denote an apparatus ID and the second-half six figures denote a serial number given to each medium that was output from this apparatus. In the internal data, "F" means a fax number, "E" means an e-mail address, and "FE" means both. A character string in parentheses denotes a fax number or an e-mail address of what business connection was output.

Whereas the above correspondence information is stored, the medium ID that was generated by the medium ID generating section 34 is supplied to the code image generating section 37. The code image generating section 37 generates a code image indicating the medium ID (step 308).

FIGS. 6A and 6B illustrate a two-dimensional code image that is generated by the code image generating section 37. FIG. 6A is a grid-like representation schematically showing how units of a two-dimensional code image are arranged, and FIG. 6B is an enlarged diagram of one unit of the two-dimensional code image. This two-dimensional code image is formed by what is called an invisible toner whose maximum absorptance in the visible range (400 to 700 nm) is 15% or less, for example, and absorptance is 20% or more, for example, in the near infrared range (800 to 1,000 nm). To enhance the infrared light absorption ability which is necessary for machine reading of an image, an invisible toner whose particle diameter is in a range of 100 to 600 nm, for example, is employed. The terms "visible" and "invisible" as used herein are irrelevant to whether the toner is recognized visually or not. That is, "visible" and "invisible" are discriminated from each other by whether an image printed on a medium can be recognized due to presence/absence of color development that is caused by absorption of a particular wavelength component in the visible range. A detailed description of the formation of an image (invisible image) using an invisible toner is found in JP-A-2003-186238.

The two-dimensional code image shown in FIGS. 6A and 6B are an invisible image that enables machine reading and decoding through illumination with infrared light for a long time in a stable manner as well as high-density recording of information. Further, it is preferable that the two-dimensional code image be an invisible image that can be formed in an arbitrary region irrespective of a region of an image output medium surface where a visible image is formed. In this embodiment, an invisible image is formed over the entire medium surface (sheet surface) according to the size of a print medium. It is even preferable that the two-dimensional code image be an invisible image that can be recognized visually due to a gloss difference, for example. However, the term "entire surface" does not include all of four corner portions of a sheet. In electrophotographic or like apparatus, a peripheral portion of a sheet is usually is an unprintable region and hence it is not necessary to print an invisible image in that region.

The two-dimensional code pattern shown in FIG. 6B is formed by bitmaps of plural minute lines having different rotation angles. More specifically, bit "0" and bit "1" are represented by a slash "/" and a backslash "\" having different inclinations, respectively. For example, the slash "/" having one inclination represents bit "0" and the backslash "\" having the other inclination represents bit "1." The use of bit maps of minute lines having two inclinations makes it possible to provide a two-dimensional code pattern capable of burying, at a high density, a large amount of digital information that gives very little noise to a visible image. The interval between adjoining minute lines is 0.3 mm, for example, and one unit bit map can be formed by minute lines of eight dots, for example. In this case, one unit is about 2.1 mm in length. It is preferable that one unit consist of 3 to 10 dots. Too small a number of dots are not preferable because of a small information amount. One unit consisting of 10 or more dots is not preferable because the two-dimensional code pattern appears as noise in a visible image.

The two-dimensional code formed in this manner contains the medium ID as coded by error correction, error detection, or the like. As shown in FIG. 6A, two-dimensional codes containing the same medium ID are arranged in grid form over the entire medium surface (sheet surface) according to the size of a print medium.

In this embodiment, it is sufficient for the two-dimensional codes to include at least the medium ID. However, where certain processing is performed by using coordinates on a medium surface, coordinate information may be included in the two-dimensional codes.

The description of the process executed by the processing apparatus 30 will be continued by referring to FIG. 3 again. The document image is sent from the document image generating section 33 to the image combining section 38, and the code image is sent from the code image generating section 37 to the image combining section 38. The image combining section 38 combines those images into a composite image (step 309). Finally, the image output section 39 outputs the composite image to the apparatus main body 20 (step 310).

Figure 7:
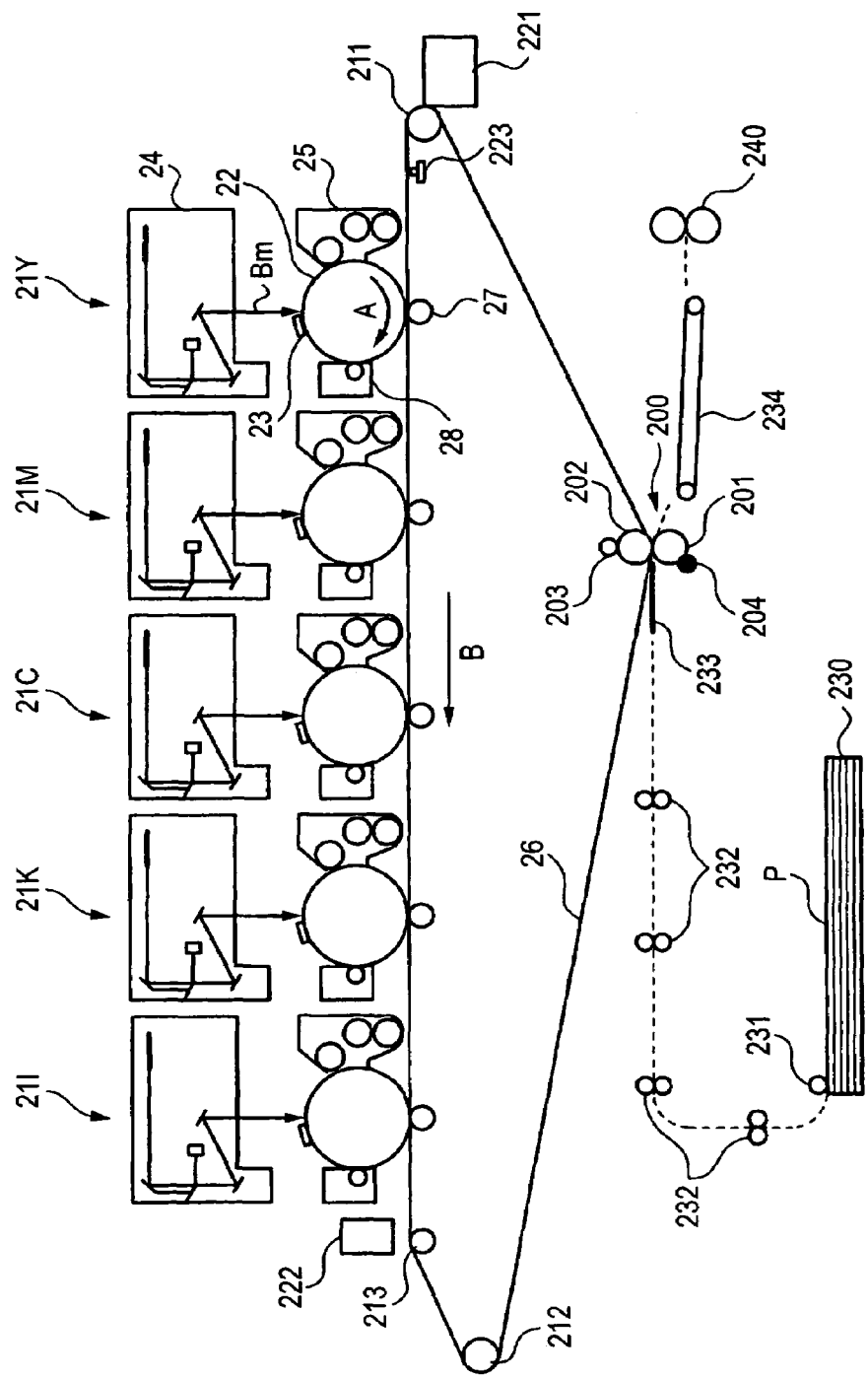
FIG. 7 shows an exemplary configuration of an apparatus main body of the image forming apparatus according to the embodiment of the invention.

FIG. 7 shows an exemplary configuration of the apparatus main body 20. The apparatus main body 20 of FIG. 7 is what is called a tandem-type apparatus, and includes plural image forming units 21 (21Y, 21M, 21C, 21K, and 21I) in each of which a toner image of each color component is formed by an electrophotographic method, an intermediate transfer belt 26 that holds toner images of the respective color components that are formed in the respective image forming units 21 and sequentially transferred to it (primary transfer), a secondary transfer device 200 that transfers together, to a sheet (medium) P, the superimposed images that have been transferred to the intermediate transfer belt 26 (secondary transfer), and a fusing device 240 that fuses the secondarily transferred image on the sheet P.

In the apparatus main body 20, the image forming unit 21K that forms a black (K) toner image having no absorption in the infrared range and the image forming unit 21I that forms an invisible toner image are provided in addition to the image forming units that forms toner images of yellow (Y), magenta (M), and cyan (C) (ordinary colors) as part of the tandem image forming units. The compositions of the toners will be described below in detail.

In this embodiment, in each of the image forming units 21 (21Y, 21M, 21C, 21K, and 21I), electrophotographic devices are disposed in order around a photoreceptor drum 22 which rotates in a direction indicated by arrow A. The electrophotographic devices include a charger 23 that charges the photoreceptor drum 22, a laser exposing device 24 that writes an electrostatic latent image onto the photoreceptor drum 22 (in the figure, an exposing beam is denoted by symbol Bm), a developing device 25 that visualizes the electrostatic latent image on the photoreceptor drum 22 with a toner of a corresponding color component accommodated in the developing device 25 itself, a primary transfer roll 27 that transfers the toner image of the corresponding color component formed on the photoreceptor drum 22 to the intermediate transfer belt 26, and a drum cleaner 28 that removes residual toner on the photoreceptor drum 22. The yellow (Y), magenta (M), cyan (C), black (K), and invisible (I) image forming units 21 are arranged in this order in the downstream direction of the intermediate transfer belt 26.

The intermediate transfer belt 26 is made rotatable by various rolls in a direction B indicated in the figure. The rolls include a driving roll 211 which is driven by a motor (not shown) and rotates the intermediate transfer belt 26, a tension roll 212 which gives prescribed tension to the intermediate transfer belt 26 and has a function of preventing snaking of the intermediate transfer belt 26, an idle roll 213 which supports the intermediate transfer belt 26, and a backup roll 202 (described below).

A voltage whose polarity is opposite to the toner charging polarity is applied to each primary transfer roll 27, whereby toner images formed on the respective photoreceptor drums 22 are sequentially attracted electrostatically and superimposed toner images are formed on the intermediate transfer belt 26. The secondary transfer device 200 includes a secondary transfer roll 201 which is in pressure contact with the toner image carrying surface of the intermediate transfer belt 26 and the backup roll 202 which is disposed on the backside of the intermediate transfer belt 26 and serves as a counter electrode of the secondary transfer roll 201. A metal electricity supply roll 203 to which a secondary transfers bias is applied stably is kept in contact with the backup roll 202. A brush roll 204 that removes stains that are stuck to the secondary transfer roll 201 is kept in contact with the secondary transfer roll 201.

A belt cleaner 221 that cleans the front surface of part of the intermediate transfer belt 26 that has been subjected to a secondary transfer is disposed downstream of the secondary transfer roll 201. On the other hand, an image density sensor 222 for image quality adjustment is disposed upstream of the secondary transfer roll 201. Further, a reference sensor (home position sensor) 223 that generates a reference signal as a reference for image formation timing in each image forming unit 21 is disposed upstream of the yellow (Y) image forming unit 21Y. The reference sensor 223 generates a reference signal by recognizing a prescribed mark that is provided on the back side of the intermediate transfer belt 26. Each image forming unit 21 starts image formation according to an instruction that is sent from a controller (not shown) based on the reference signal.

The apparatus main body 20 according to the invention further includes a sheet transport system, which is composed of a sheet tray 230 that accommodates sheets P, a pickup roll 231 that picks up and sending out one of the sheets P stacked in the sheet tray 230 with prescribed timing, transport rolls 232 that transports the sheet P that has been sent out by the pickup roll 231, a transport chute 233 that sends the sheet P that has been transported by the transport rolls 232 to a secondary transfer position of the secondary transport device 200, and a transfer belt 234 that transports the sheet that has been subjected to a secondary transfer to the fusing device 240.

Next, an image forming process of the apparatus main body 20 will be described. When a start switch (not show) is on-manipulated by a user, a prescribed image forming process is executed, which will be described below specifically. For example, where the apparatus main body 20 is a color printer, digital image signals of the five colors (Y, M, C, K, and I) that are transmitted from the processing apparatus 30 are stored in the memory (temporary storage) and toner images of the respective colors are formed based on the stored digital image signals.

The image forming units 21 (21Y, 21M, 21C, 21K, and 21I) are driven based on the respective image recording signals that have been obtained by image processing. In each of the image forming units 21Y, 21M, 21C, 21K, and 21I, an electrostatic latent image corresponding to the image recording signal is written onto the photoreceptor drum 22 by the laser exposing device 24. The thus-formed electrostatic latent image is developed by the developing device 25 which accommodates a toner of the corresponding color, whereby a toner image of the corresponding color is formed.

The toner images formed on the respective photoreceptor drums 22 are primarily transferred from the photoreceptor drums 22 to the front surface of the intermediate transfer belt 26 at the primary transfer positions where the photoreceptor drums 22 are in contact with the intermediate transfer belt 26 by the primary transfer biases that are applied by the primary transfer rolls 27. The toner images that have been primarily transferred to the intermediate transfer belt 26, which are superimposed on each other on the intermediate transfer belt 26, are transported to the secondary transfer position as the intermediate transfer belt 26 rotates.

On the other hand, a sheet P is transported to the secondary transfer position of the secondary transfer device 200 with prescribed timing and is nipped between the intermediate transfer belt 26 (backup roll 202) and the secondary transfer roll 201. The superimposed toner images carried by the intermediate transfer belt 26 are secondarily transferred to the sheet P by the action of a secondary transfer electric field that is formed between the secondary transfer roll 201 and the backup roll 202.

Then, the sheet P which the toner images have been transferred is transported by the transfer belt 234 to the fusing device 240, where the toner images are fused. On the other hand, residual toner is removed by the belt cleaner 221 from the part of the intermediate transfer belt 26 that has been subjected to the secondary transfer.

The toners used in the apparatus main body 20 will be described below in detail.

First, the Y toner, the M toner, an the C toner which are used in the image forming units 21Y, 21M, and 21C are conventional toners, respectively.

In contrast, the K toner which is used in the image forming unit 21K is a special toner. This is because conventional K toners (carbon black is used as a black colorant) absorb infrared light and hence are not suitable for use in formation of an ordinary image in which information is not buried in this system in which information that is buried by using the invisible toner is read through illumination with infrared light. That is, in this embodiment, a toner whose infrared absorptance is very low and that enables black printing is employed as the K toner. An example of such a toner is a toner obtained by mixing a Y toner, an M toner, and a C toner.

Although the K toner used in this embodiment has different properties than conventional ones, in this specification, for the sake of convenience, such a special toner is referred to as "K toner."

For example, a material described in JP-A-2003-186238 can be used as the I toner. That is, a toner including a binding resin and a near infrared light absorption material made of inorganic material particles can be used.

Examples of the binding resin are polystyrene, a styrene-alkyl acrylate copolymer, a styrene-alkyl methacrylate copolymer, a styrene-acrylonitrile copolymer, a styrene-butadiene copolymer, a styrene-maleic anhydride copolymer, polyethylene, and polypropylene.

Inorganic material particles containing at least CuO and $P_2O_5$ can be used as the near infrared light absorption material. It is preferable that the CuO content of the invisible toner particles being range of 6 to 35% by mass, and it is even preferable that it be in a range of 10 to 30% by mass. Further, to obtain uniform dispersion of the inorganic material particles in the invisible toner and a proper frictional electrification characteristic (negative polarity) that they should have as an electrophotographic recording material, it is preferable that the inorganic material particles be made of copper-phosphate crystallized glass containing CuO, $Al_2O_3$, $P_2O_5$, and $K_2O$ as indispensable components. As for the composition of the copper-phosphate crystallized glass, it is preferable that the CuO content be in a range of 20 to 60% by mass, the $Al_2O_3$ content be in a range of 1 to 10% by mass, the $P_2O_5$ content be in a range of 30 to 70% by mass, and the $K_2O$ content be in a range of 1 to 10% by mass.

Figure 8A:
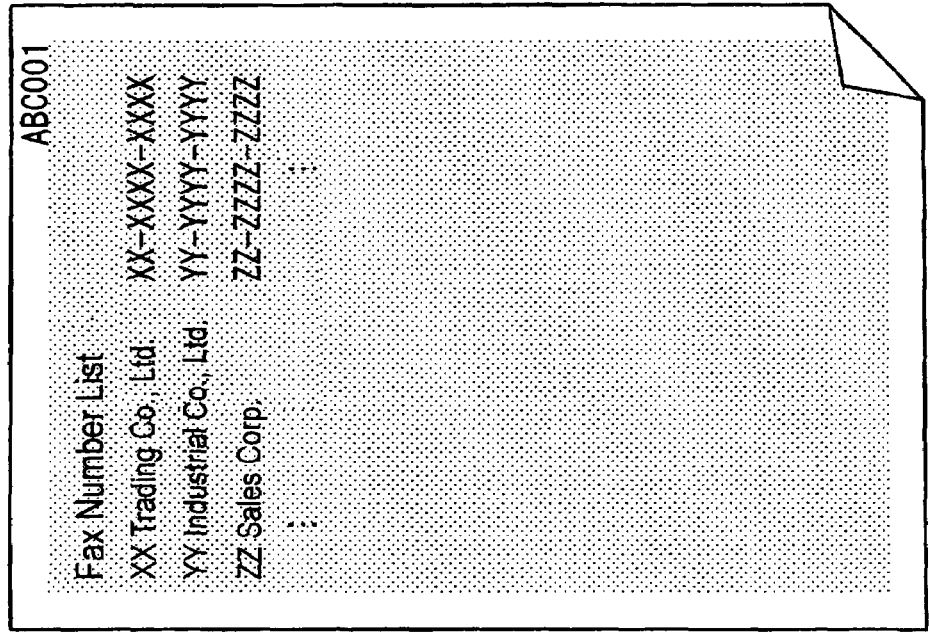
FIGS. 8A and 8B show exemplary printed images that are output by the image forming apparatus according to the embodiment of the invention.
Figure 8B:
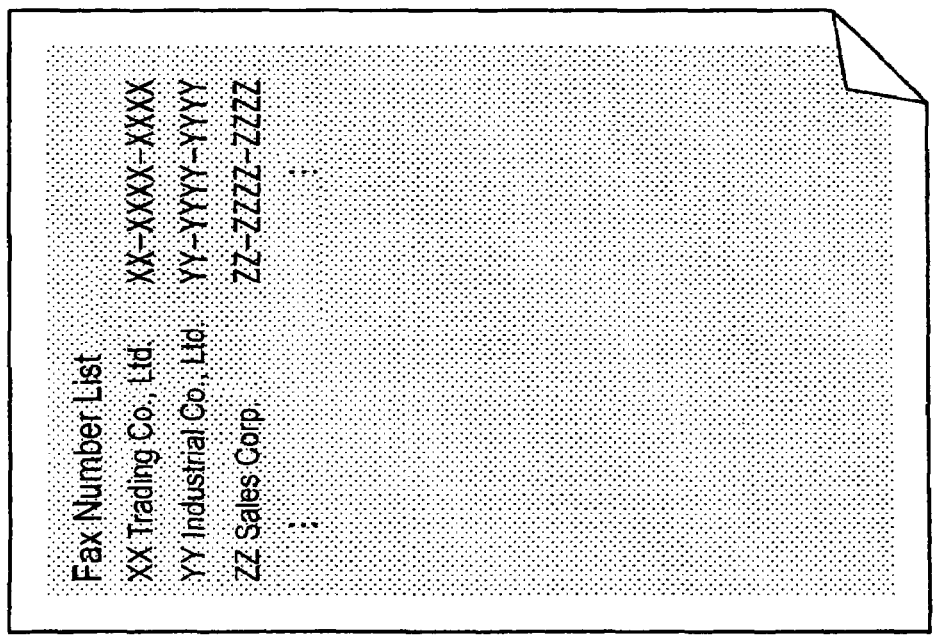

FIGS. 8A and 8B show exemplary printed images (fax number lists) produced by printing an image that is output through execution of the process of the flowchart of FIG. 3 on a medium by the apparatus main body 20 having the configuration of FIG. 7.

FIG. 8A shows a medium on which a document image obtained by editing internal data is printed with visible toners and a code image is printed with the invisible toner so as to be superimposed on the document image. Although actually the code image printed with the invisible toner cannot be recognized visually, in FIGS. 8A and 8B it is indicated by shading for convenience.

Incidentally, consideration will be given to a case that a fax number list in which a medium ID is buried by using the invisible toner is taken away. For example, if an organization from which a fax number list was taken away is of a relatively small scale and the fax number list has been found near the organization, an image forming apparatus 10 that was used for printing the fax number list may be identified easily. Once the image forming apparatus 10 is identified, a person who was involved in the output of the fax number list and information included in the list can be traced by searching the correspondence information storage section 36 of the apparatus 10.

However, if an organization from which a fax number list was taken away is of a large scale and an image forming apparatus 10 that was used for its printing cannot be identified at all, it would be difficult to do such tracing.

Therefore, it is effective to print only the apparatus ID of the image forming apparatus 10 with visible toners as shown in FIG. 8B. This makes it possible to easily trace a person who was involved in the output of the fax number list and information included in the list by investigating the correspondence information storage section 36 of an image forming apparatus 10 having an apparatus ID "ABC001."

Where the apparatus ID is printed with visible toners as shown in FIG. 8B, it is no longer necessary to print the apparatus ID with the invisible toner. That is, although the above description has been made with the assumption that the medium ID includes the apparatus ID, the medium ID need not include the apparatus ID in the case where printing is performed in the manner shown in FIG. 8B.

Incidentally, when a medium as shown in FIGS. 8A and 8B in which a medium ID is buried was taken away, the medium ID can be read from the medium by using a special image reading apparatus. A description will be made of information reading by a pen-type input device 70 which is such an image reading apparatus.

Figure 9:
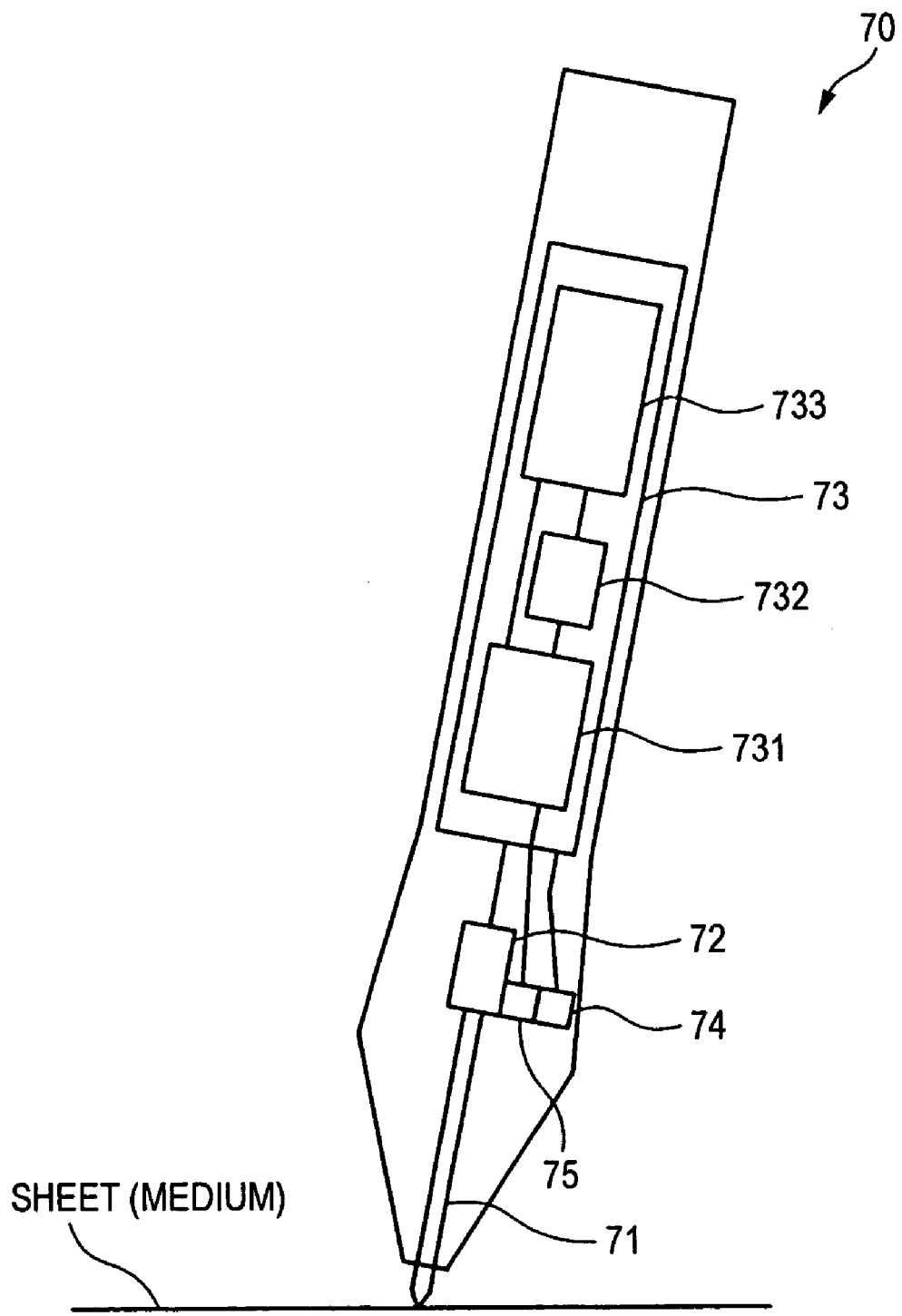
FIG. 9 shows the configuration of an exemplary pen-type input device according to the embodiment of the invention.

FIG. 9 shows the configuration of the pen-type input device 70. In this embodiment, it is sufficient for the pen-type input device 70 to be able to read a medium ID. However, FIG. 9 shows the configuration of the pen-type input device 70 that is used for writing a character or a figure on a medium and reading its locus.

The pen-type input device 70 including a writing section 71 that records a character or a figure on a sheet (medium) on which a composite image of a code image and a document image is printed by the same kind of manipulation as is performed with an ordinary pen and a pen pressure detecting section 72 that detects whether the pen-type input device 70 is pressed against the sheet by monitoring a movement of the writing section 71. The pen-type input device 70 also includes a controller 73 that controls electronic operation of the entire pen-type input device 70, an infrared light emitting section 74 that illuminates the sheet with infrared light to read the code image on the sheet, and an image input section 75 that picks up and reads the code image being illuminated with infrared light.

The controller 73 will be described below in more detail.

The controller 73 is provided with a code acquiring section 731, a locus calculating section 732, and an information storage section 733. The code acquiring section 731 is a section that acquires a code by analyzing an image that is read from the image input section 75. For acquisition of the medium ID, the code acquiring section 731 is a section that can also be regarded as a medium ID acquiring section. The locus calculating section 732 is a section that calculates a locus of the pen point of the writing section 71 by correcting for deviations between the coordinates of the pen point and those of the image picked up by the image input section 75. The information storage section 733 is a section that stores the code acquired by the code acquiring section 731 and the local information calculated by the locus calculating section 732. The information storage section 733 can also be regarded as an information output section if its function of outputting the stored information is also included.

Figure 10:
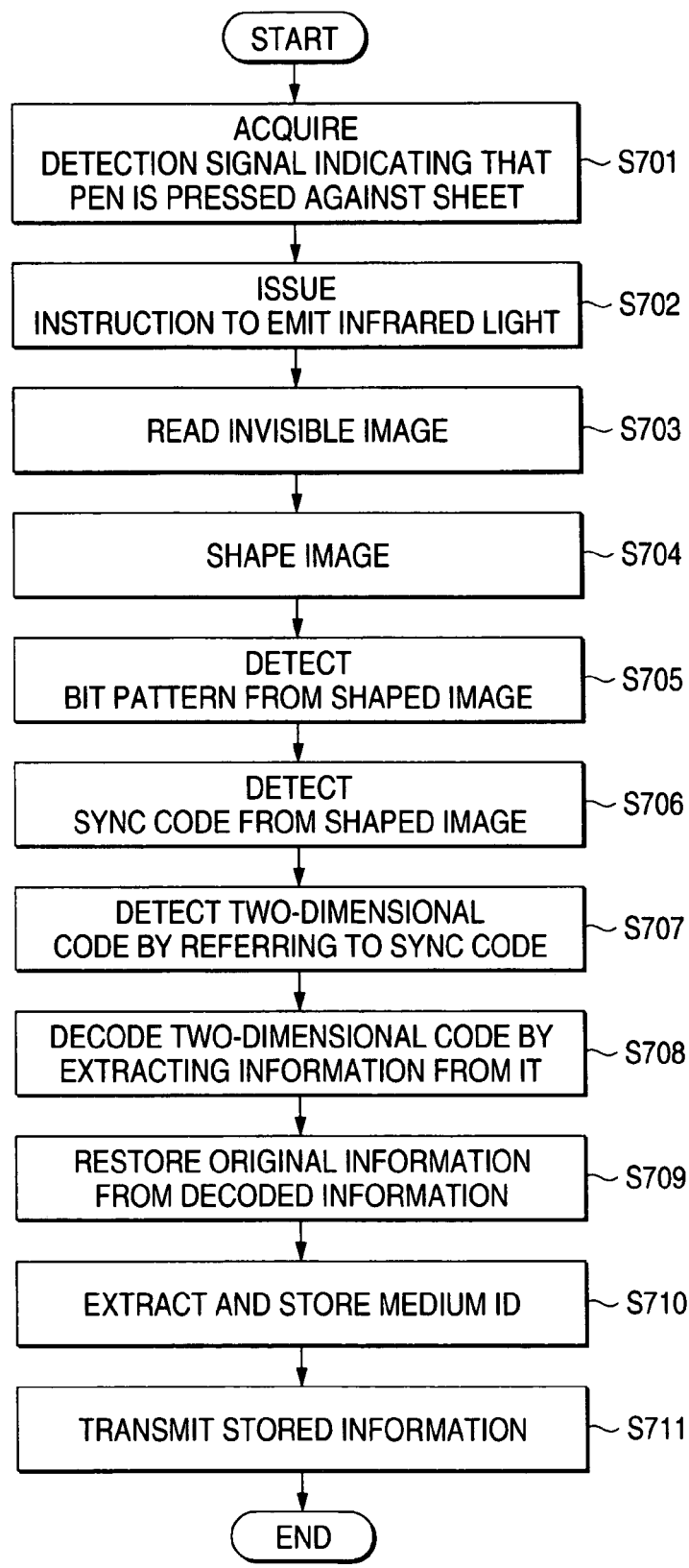
FIG. 10 is a flowchart of a process executed by the pen-type input device according to the embodiment of the invention.

FIG. 10 is a flowchart of a process that is mainly executed by the controller 73 of the pen-type input device 70. When the pen-type input device 70 is pressed against a sheet, the controller 73 acquires, from the pen pressure detecting section 72, a detection signal indicating that the pen-type input device 70 is pressed against the sheet (step 701). Upon detecting the detection signal, the controller 73 instructs the infrared light emitting section 74 to apply infrared light to the sheet (step 702). The infrared light that is applied to the sheet by the infrared light emitting section 74 is absorbed by an invisible image. The image input section 75 picks up a code image being illuminated with the infrared light. The controller 73 reads (i.e., scans) the invisible image via the image input section 75 (step 703).

Then, the code acquiring section 731 executes a code image detecting process (steps 704-710). First, the code acquiring section 731 shapes the received scan image (step 704). The scan image shaping is an inclination correction, noise elimination, etc. The code acquiring section 731 detects a bit pattern (slant line pattern) such as slashes "/" and back slashes "/" from the shaped scan image (step 705). On the other hand, the code acquiring section 731 detects a sync code as a two-dimensional code positioning code from the shaped scan image (step 706). The code acquiring section 731 detects a two-dimensional code by referring to the sync code position (step 707). Then, the code acquiring section 731 decodes the two-dimensional code by extracting such information as an ECC (error correcting code) from the two-dimensional code (step 708), and restores original information from decoded information (step 709).

The code acquiring section 731 of the controller 73 extracts a medium ID from the thus-restored code information and stores the extracted information in the information storage section 733 (step 710). The medium ID stored in the information storage section 733 is transmitted, via a cable or by radio, to the image forming apparatus 10 having the correspondence information that correlates medium IDs, user IDs, output dates and times, and internal data (step 711).

Although in this embodiment the pen-type input device 70 is configured so as to read a code image through illumination with infrared light, it may be configured so as to read a code image through illumination with ultraviolet light.

Figure 11:
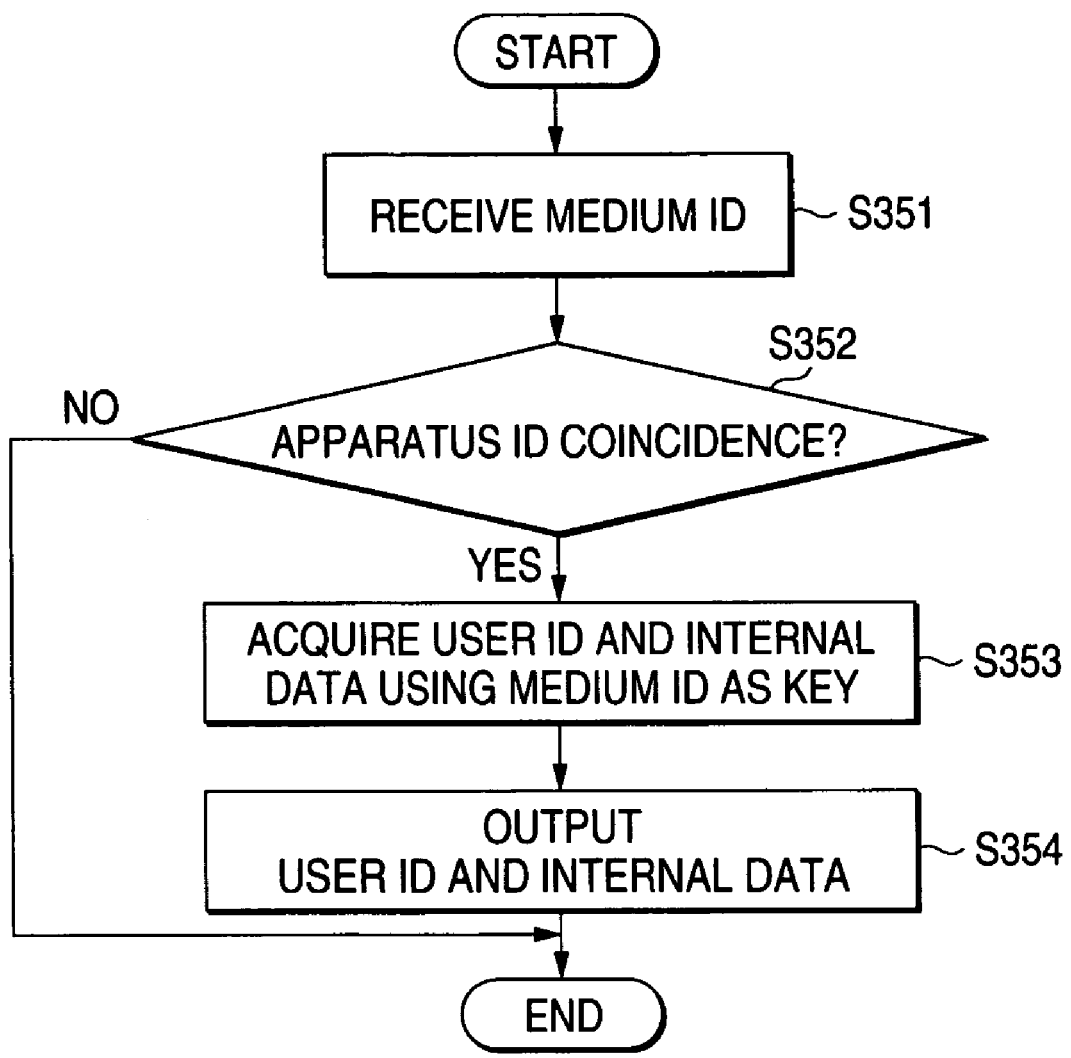
FIG. 11 is a flowchart showing a tracing operation of the processing apparatus of the image forming apparatus according to the embodiment of the invention.

On the other hand, in the image forming apparatus 10, the communication device 50 receives the thus-transmitted medium ID. The received medium ID is delivered to the processing apparatus 30. How the processing apparatus 30 operates in this case will be described below with reference to FIG. 11.

First, the instruction receiving section 32 of the processing apparatus 30 acquires the medium ID from the communication device 50 (step 351). Usually, the medium ID consists of an apparatus ID to be used for uniquely identifying an image forming apparatus 10 and a serial number of each medium on which image formation is performed by the apparatus 10. Therefore, the instruction receiving section 32 judges whether apparatus ID coincidence is found (step 352).

If apparatus ID coincidence is not found, a message such as "The medium was not subjected to printing by this apparatus" is displayed and the process is finished. On the other hand, if apparatus ID coincidence is found, since the medium was not subjected to printing by the apparatus 10 concerned, the correspondence information storage section 36 is searched with the medium ID used as a key and a user ID, internal data, etc. are obtained (step 353). The user ID, internal data, etc. are output to the input/output device 40 (step 354).

Where the apparatus ID is printed with visible toners as shown in FIG. 8B, it can be recognized visually. It is therefore unlikely that tracing is performed by transmitting a medium ID to an image forming apparatus 10 having a different medium ID. Therefore, the judgment at step 352 may be omitted in the case where such printing is performed.

Then, the process of the image forming apparatus 10 is finished.

In this embodiment, a code image indicating a medium ID is printed with the invisible toner. However, this configuration raises the following problem.

That is, when a fax list or the like as shown in FIGS. 8A and 8B in which a medium ID has been printed with the invisible toner is copied by an ordinary copier, a fax list or the like is produced in which the medium ID is not printed. This is because ordinary copiers cannot recognize a transparent image formed with the invisible toner and hence cannot copy it. Even if an apparatus ID is printed with visible toners as shown in FIG. 8B, a fax list or the like having no information indicating a medium ID is produced by copying a fax list or the like after painting over the apparatus ID with white correction liquid.

To solve this problem, the above embodiment may be modified in such a manner that the shading portion shown in each of FIGS. 8A and 8B is printed with visible toners. In this configuration, a medium ID remains even if copied by an ordinary copier. If it is attempted to paint over a medium ID with white correction liquid, fax numbers will also be painted over; it is very difficult to produce a copy in which only the medium ID is erased.

Where a medium ID is printed with visible toners as described above, the medium ID can be read by an ordinary scanner; that is, it is not necessary to use a special image reading apparatus having the function of emitting infrared light or the like. The scanner for this purpose may be the scanner as part of the image forming apparatus 10 or a dedicated scanner capable of transmitting a read-out medium ID to the image forming apparatus 10 via a cable or by radio. However, it is necessary that an application program for acquiring a medium ID by analyzing a code ID that is read out by the scanner.

In the above embodiment, a user ID is managed so as to be included in correspondence information and a medium ID that is correlated with the user ID is buried in a medium. Alternatively, a user ID may directly be buried in a medium.

Further, although in the above embodiment internal data themselves are included in correspondence information, the invention is not limited to such a configuration. That is, a document image generated based on internal data may be included in correspondence information or file obtained by further converting a document image into a prescribed format (e.g., PDF) may be included in correspondence information.

Still further, in the above embodiment, correspondence information that correlates a medium ID, a user ID, an output date and time, and internal data is stored only in an image forming apparatus that performed printing on a medium concerned. However, a system may be constructed in which plural image forming apparatus are connected to a server computer via a network and sets of pieces of correspondence information of the respective image forming apparatus are managed intensively by the server computer. In this configuration, by what image forming apparatus a print medium found outside was printed can easily become known by inquiring of the server computer. Therefore, a user or the like who was involved in the printing can easily be traced.

Although it is assumed in the above embodiment that data to be printed on a medium are managed data in the image forming apparatus, the invention is not limited to such a case. For example, data to be printed on a medium may be data that can be acquired externally by referring to address information such as URLs stored in the image forming apparatus.

As described above, in the above embodiment, when internal data are printed on a medium, correspondence information that correlates the internal data with a medium ID for identifying the medium is stored. With this measure, even if a medium is torn and part of it is taken away, internal data printed on the taken-away part of the medium can be identified if the medium ID is recognized from the other part. Such recognition of a medium ID from part of a medium can be realized by printing the medium ID over the entire medium at a prescribed pitch.

In the above embodiment, when internal data are printed on a medium, correspondence information that correlates a medium ID for identifying the medium and a user ID for identifying a user who orders the printing is stored. With this measure, when a medium on which internal data are printed is taken away, by whom and when the medium was output can be recognized easily. For example, even if the printing of internal data is restricted, there may occur an event that a third person takes away a medium because an authorized person is negligent in the management of media. Or a third person may print internal data by pretending to be an authorized person. In such a case, the embodiment makes it easier to identify the authorized person who gave an opportunity for information leakage and a date and time when he or she output the medium.

The invention may make it possible to prevent data managed by an image forming apparatus from leaking outside.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

The entire disclosure of Japanese Patent Application No. 2005-139421 filed on May 12, 2005 including specification, claims, drawings and abstract is incorporated herein by reference in its entirety.

What is claimed is:

1. An image processing apparatus comprising:
   a document image generating section that generates a document image based on a managed data in the apparatus;
   a medium ID generating section that generates a medium ID for identifying a medium on which the document image is printed;
   a correspondence information storing section that stores correspondence information by which the managed data and the medium ID are correlated with each other; and
   an image output section that outputs an image in which a code image indicating the medium ID is superimposed on the document image,
   wherein the medium ID includes identification information of an image forming apparatus and a serial number that is given to each medium on which printing is performed by the image forming apparatus.

2. The image processing apparatus according to claim 1, wherein the managed data relates to an address that is registered as a destination address of the apparatus.

3. The image processing apparatus according to claim 1, wherein the correspondence information includes a user ID for identifying a user who gives an order for printing of the document; and wherein the user ID is correlated with at least one of the managed data and the medium ID.

4. An image forming apparatus, comprising:
   a document image generating section that generates a document image based on a managed data in the apparatus;
   a medium ID generating section that generates a medium ID for identifying a medium on which the document image is printed; and
   a print processing section that prints a code image indicating the medium ID and the document image on the medium;
   wherein the code image and the document image are superimposed on each other,
   wherein the medium ID includes identification information of the image forming apparatus and a serial number that is given to each medium on which printing is performed by the image forming apparatus.

5. The image forming apparatus according to claim 4, wherein the print processing section prints the code image with an invisible toner.

6. The image forming apparatus according to claim 5, wherein the print processing section prints an apparatus ID for identifying the apparatus with a visible toner.

7. The image forming apparatus according to claim 6, wherein the medium ID does not include the apparatus ID.

8. The image forming apparatus according to claim 4, wherein the print processing section prints the code image with a visible toner.

9. A medium managing method, comprising:
   generating a document image based on a managed data in an apparatus, according to an instruction;
   generating a medium ID for identifying a medium on which the document image is printed;
   storing correspondence information in a storage device, the correspondence information correlating at least one of data relating to the instruction and the managed data with the medium ID;
   printing a code image indicating the medium ID and the document image on the medium;
   acquiring the medium ID from a code image printed on a prescribed medium; and
   acquiring at least one of the data relating to the instruction and the managed data from the correspondence information stored in the storage device based on the medium ID wherein the code image and the document image are superimposed on each other,
   wherein the medium ID includes identification information of an image forming apparatus and a serial number that is given to each medium on which printing is performed by the image forming apparatus.

10. The medium managing method according to claim 9, wherein the medium ID acquiring step acquires the medium ID by detecting a manner of absorption of infrared light or ultraviolet light by the code image to read the code image and analyzing the code image.

11. The medium managing method according to claim 9, wherein the medium ID acquiring step acquires the medium ID by detecting a manner of reflection or absorption of visible light by the code image to read the code image and analyzing the code image.

12. A storage medium readably by a computer, the storage medium storing a program of instructions executable by the computer to perform a function, the function comprising:
   generating a document image based on a managed data in an apparatus, according to an instruction;
   generating a medium ID for identifying a medium on which the document image is printed;
   storing correspondence information in a storage device, the correspondence information correlating at least one of data relating to the instruction or the managed data with the medium ID; and
   outputting an image in which a code image indicating the medium ID is superimposed on the document image,
   wherein the medium ID includes identification information of an image forming apparatus and a serial number that is given to each medium on which printing is performed by the image forming apparatus.

13. The storage medium according to claim 12, wherein the data relating to the instruction relate to a user who gives the instruction.

14. The storage medium according to claim 12, wherein the managed data relate to a address that are registered as a destination address of the apparatus.

* * * * *